Patented Nov. 26, 1929

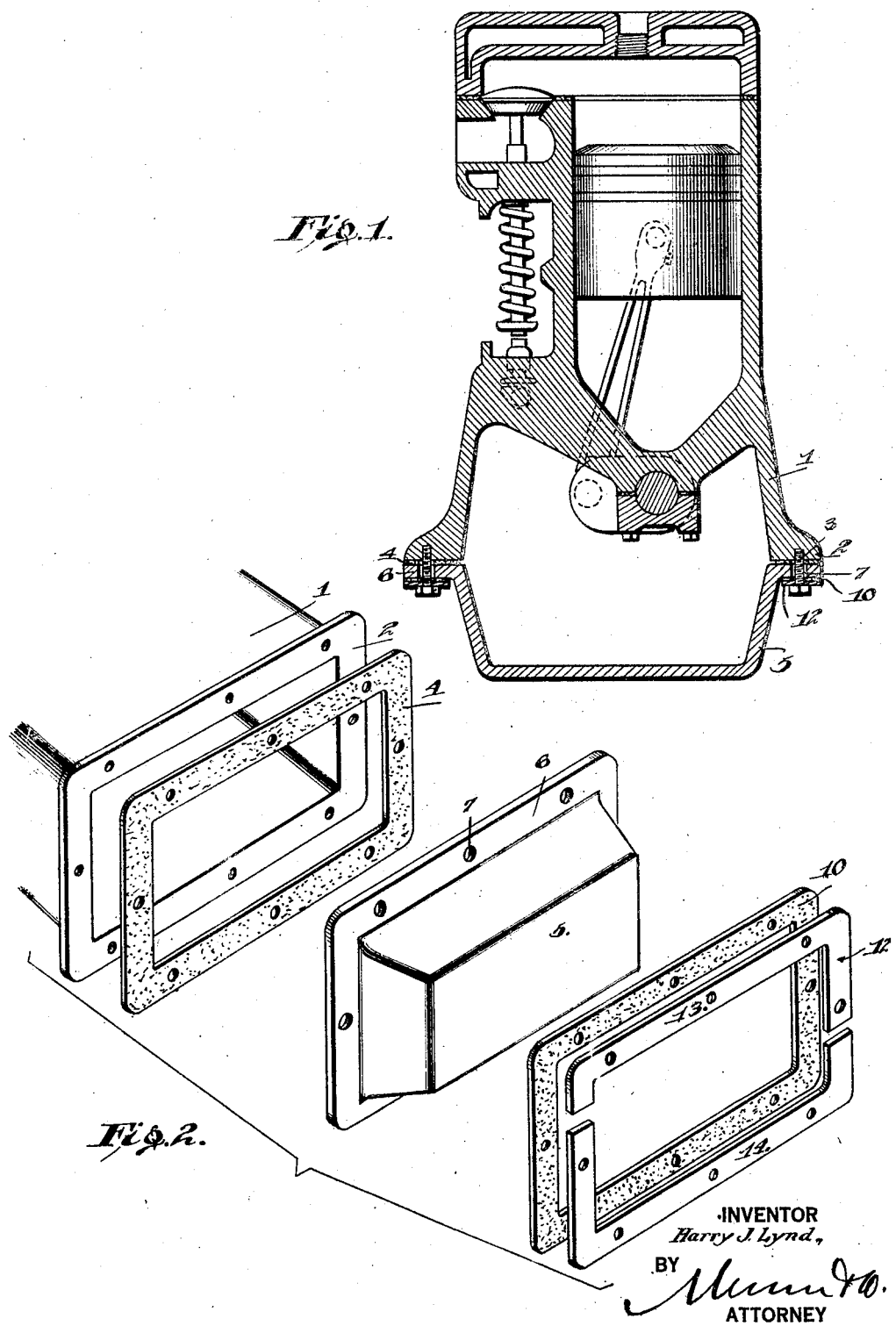

1,737,466

UNITED STATES PATENT OFFICE

HARRY J. LYND, OF PARSONS, KANSAS

NOISE ELIMINATOR FOR INTERNAL-COMBUSTION ENGINES

Application filed December 12, 1927. Serial No. 239,543.

This invention relates to noise eliminators for internal combustion engines, and more particularly to crank case opening covers and pans for such engines.

It is well known that in the operation of the revolving and frictional parts of an internal combustion engine, vibrations are created in the cylinder block or main engine casting, and having no outlet, remain within the casting, preventing the free delivery of power and also reflect noise in the lower crank case cover at high engine speeds.

A primary object of the invention is to provide an assembly to be used on crank case opening covers and pans for absorbing and liberating metallic vibrations in an internal combustion engine.

Another object of the invention is to provide outlet means for these vibrations, which also constitute an oil tight joint, which may be subjected to continued use without attention, and in which there is no metallic connection between the adjoining parts.

In carrying out these objects, the invention is susceptible of a wide range of modification without departing from the spirit of the invention or sacrificing any of the advantages of the claimed invention; there being shown in the drawings for illustrative purposes a preferred and practical form, in which:

Figure 1 represents a vertical section through an internal combustion engine with this improved eliminator shown applied between the engine casting and crank case cover; and Fig. 2 represents a group view in perspective of the device constituting this invention.

In the embodiment illustrated, a cylinder casting or upper crank case cover 1 is shown having the usual laterally extending attaching flange 2 into or through which pass bolts 3 for connecting the lower crank case cover 5 to the casting. This lower crank case cover 5 is also provided with a laterally extending flange 6, the bolt holes 7 of which are larger than the bolts 3 to relieve this part of the structure of a metallic connection with the casting 1.

The usual leakage preventing gasket 4 is placed between the crank case flange 2 and the lower crank case or pan flange 6. Carried by the bolts 3 below the flange 6 of the crank case cover is a vibration absorbing gasket 10, which may be composed of the same material as the gasket 4 the only requisite being that these gaskets shall be capable of absorbing vibration. Arranged below the gasket 10 and carried by the bolts 3 is a pressure plate 12 which also operates as a protector for the gasket 10. This plate 12 is split being preferably made in two sections 13 and 14, as shown in Fig. 2 to facilitate the alinement of the bolts in their proper plates.

In Fig. 2 the engine casting flange 2 is also shown in its relation to the features constituting the invention to illustrate more clearly the assembling of the parts.

It will thus be seen that when the noise absorbing gasket 10 is placed outside the flange 6 of the crank case oil pan 5 with the openings in the flange 6 made of such size as to permit the bolts 3 to pass therethrough without contacting with the walls thereof as shown in Fig. 1 and the pressure plate 12 applied that the crank case cover 5 will be securely attached to the engine casting 1 without any metallic connection being formed between the adjoining parts, then an outlet for the vibrations in the metallic parts is provided by the use of this absorption gasket 10 and the protecting plate 12.

Without further description it is thought that the features and advantages of the invention will be readily apparent to those skilled in the art, and it will of course be understood that changes in the form, proportion and minor details of construction may be resorted to, without departing from the spirit of the invention or its scope as claimed.

I claim:—

The combination with an engine crank case and pan having laterally extending attaching flanges for connecting them together, said flanges having bolt holes therein, the holes in one flange being larger than those in the other, a vibration absorbing gasket arranged between said flanges, bolts passing through or into said flanges and gasket, another vibration absorbing gasket arranged outside the flange having the larger openings therein and through which said bolts also pass whereby the members are connected and the flanges secured against metallic contact, and a protecting pressure plate arranged outside the last mentioned gasket and secured by said bolts.

Signed at Parsons in the county of Labette and State of Kansas, this 17 day of November 1927.

HARRY J. LYND.